United States Patent
Marchis et al.

(10) Patent No.: US 11,313,415 B2
(45) Date of Patent: Apr. 26, 2022

(54) METHOD FOR MANUFACTURING A SENSOR BEARING UNIT, AND ASSOCIATED SENSOR BEARING UNIT

(71) Applicant: Aktiebolaget SKF, Gothenburg (SE)

(72) Inventors: Renato Marchis, Turin (IT); Eric Robert, Saint Cyr sur Loire (FR); Vincent Sausset, Azay-le-Rideau (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/090,932

(22) Filed: Nov. 6, 2020

(65) Prior Publication Data

US 2021/0164521 A1  Jun. 3, 2021

(30) Foreign Application Priority Data

Nov. 28, 2019  (IT) .................. 102019000022332

(51) Int. Cl.
*F16C 41/00* (2006.01)
*F16C 43/04* (2006.01)

(52) U.S. Cl.
CPC ............ *F16C 41/007* (2013.01); *F16C 43/04* (2013.01); *F16C 2220/62* (2013.01); *F16C 2220/70* (2013.01); *F16C 2223/10* (2013.01)

(58) Field of Classification Search
CPC ...... F16C 33/583; F16C 33/586; F16C 33/64; F16C 41/007; F16C 43/04; F16C 2220/62; F16C 2220/70; F16C 2223/10
See application file for complete search history.

(56) References Cited

U.S. PATENT DOCUMENTS

| | | | |
|---|---|---|---|
| 6,502,486 B1 * | 1/2003 | Tenbrack | B23P 13/04 82/1.11 |
| 9,494,196 B2 * | 11/2016 | Sausset | G01P 3/443 |
| 2003/0193120 A1 | 10/2003 | Gegner | |

FOREIGN PATENT DOCUMENTS

| | | | | |
|---|---|---|---|---|
| CN | 203495765 U | * | 3/2014 | |
| CN | 105715671 A | * | 6/2016 | ............ F16C 33/586 |
| DE | 19840738 A1 | | 3/2000 | |
| DE | 102017218880 A1 | | 5/2018 | |
| DE | 102020131569 A1 | * | 6/2021 | ............ F16C 33/64 |
| EP | 2525110 A1 | | 11/2012 | |
| EP | 3128193 A1 | * | 2/2017 | ............... C21D 1/18 |
| JP | 2001289254 A | | 10/2001 | |
| WO | WO-2011076229 A1 | * | 6/2011 | ............ F16C 41/008 |
| WO | WO-2013141319 A1 | * | 9/2013 | ............ F16C 33/64 |
| WO | WO-2015190980 A1 | * | 12/2015 | ............ B21D 22/16 |

* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A method for manufacturing a sensor bearing unit includes providing a bearing having a first ring and a second ring capable of rotating concentrically relative to one another, and an impulse ring provided with a target holder secured into a groove made in a cylindrical surface of the first ring, and with a magnetic target mounted on the target holder. The method including applying on a first ring blank a heat-treatment in which the metal is hardened, hard machining the groove in the cylindrical surface of the first ring blank after the step of heat treating, and introducing and securing the target holder of the impulse ring inside the groove of the machined first ring. Also a sensor bearing unit.

15 Claims, 3 Drawing Sheets

METHOD FOR MANUFACTURING A SENSOR BEARING UNIT, AND ASSOCIATED SENSOR BEARING UNIT

CROSS-REFERENCE TO RELATED APPLICATIONS

This application claims priority to Italian Patent Application no. 102019000022332, filed Nov. 28, 2019, the contents of which is fully incorporated herein by reference.

FIELD OF THE INVENTION

The present invention relates to a method for manufacturing a sensor bearing unit. More precisely, the present invention relates to a method for manufacturing a sensor bearing unit comprising a bearing and an impulse magnetic ring.

BACKGROUND OF THE INVENTION

Today, sensor bearing units are commonly used in a wide range of technical fields, for example in automotive industry and aeronautics. These units provide high quality signals and transmissions, while allowing integration in simpler and more compact apparatus.

Such a sensor bearing unit generally comprises a bearing, an impulse ring, and detection means facing the impulse ring. The impulse ring is provided with a target holder fixed to the inner ring of the bearing, and with a magnetized target fixed to the target holder beyond the outer ring of the bearing.

The magnetic target includes alternating North and South poles, whose number depends on bearing size, detection precision and particular application. The detection means may be fixed to the outer ring of the bearing or to a fixed casing.

The magnetic target is attached to an outer tubular portion of the target holder. The target holder is also provided with an inner tubular portion secured into a groove made in the bore of the inner ring. Classically, this groove is soft turned, and then a heat treatment is applied on the inner ring.

With such a manufacturing method, the groove presents a large concentricity defect with the inner ring bore diameter. This defect causes a degradation of the total pitch deviation of the magnetic target during assembly of the impulse ring with the inner ring.

The total pitch deviation, named TPD, is a parameter used to characterized the magnetic ring. It evaluates the cumulative error on the position of the magnetic ring by measuring the single pitch deviation for each ring pole.

Determination of the TPD for a magnetic ring with magnetic poles is similar to the determination of the TPD for gears or mechanical encoders as seen in ABS applications.

An interval is defined as the angular distance between two nearest poles of same polarity. A general method to calculate TPD is described by the following equations:

Single pitch deviation error SPD for interval i can be calculated on the basis of the formula:

$$SPD(i) = \frac{P_{Theoretical} - P_{real}(i)}{P_{Theoretical}} \times 100$$

wherein:

$P_{Theoretical}$: Theoretical period of the angular signal for an interval $P_{real}(i)$: Actual period of the angular signal for interval i.

It is to be noted that the actual period $P_{real}(i)$ is to be determined between poles of same sign, i.e. between North poles or between South poles. Similarly, the actual period $P_{real}(i)$ is to be determined between the same kind of signal edges, i.e. between rising edges or between falling edges.

Total or cumulative pitch deviation error TPD(i) for interval i can be calculated on the basis of the formula:

$$TPD(i) = \sum_{n=1}^{n=i} SPD(n)$$

Total pitch deviation error TPD on a mechanical turn can be calculated on the basis of the formula:

$$TPD = \max\left(\sum_{i=1}^{i=Nbpp} SPD(i)\right) - \min\left(\sum_{i=1}^{i=Nbpp} SPD(i)\right)$$

wherein Nbpp: Number of intervals in a mechanical turn.

One aim of the present invention is to overcome the above-mentioned drawback.

SUMMARY OF THE INVENTION

The invention relates to a method for manufacturing a sensor bearing unit comprising a bearing having a first ring and a second ring capable of rotating concentrically relative to one another, and an impulse ring provided with a target holder secured into a groove made in a cylindrical surface of the first ring, and with a magnetic target mounted on the target holder.

The method comprises the following steps:
a) applying on a first ring blank a heat-treatment in which the metal is hardened,
b) hard machining the groove in the cylindrical surface of the first ring blank after the step of heat treating,
c) introducing the target holder of the impulse ring inside the groove of the machined first ring, and
d) securing the target holder inside the groove.

The terms "hard machining the groove" is understood to mean machining the groove of the hardened first ring blank.

With such method, the concentricity defect of the groove with respect to the inner ring bore diameter is minimized since the groove is hard machined. On the contrary, in a conventional sensor bearing unit, the mounting groove made in the bore of the inner ring is only soft turned.

With the manufacturing method of the invention, the groove form defects which occur during the step of heat treating are removed. This leads to a reduction of total pitch deviation variations depending on the angular position of the target holder relative to the first ring. The measurement accuracy of the sensor bearing unit is improved.

According to further aspect, the method may further comprise, before step a), the step of preliminary machining the groove in the cylindrical surface of the first ring blank by soft turning with a machining allowance. The machining allowance may be fully removed during the hard machining step.

In one embodiment, the heat-treatment may be applied to obtain a hardness included in the range of 58 to 62 Vickers. Preferably, at step a) at least a through-hardening operation is applied.

In a first embodiment, at step b) a hard turning operation is applied.

In this case, the method may further comprise, after step b) and before step c), the step of grinding the cylindrical surface and lateral faces of the machined first ring.

In a second alternative embodiment, at step b) a hard grinding operation is applied.

In one embodiment, the method further comprises, after step b) and before step c), the step of grinding the cylindrical surface and lateral faces of the machined first ring.

In one embodiment, at step c) the target holder of the impulse ring may be secured inside the groove of the machined first ring by press-fitting.

In one embodiment, at step b) the groove is hard machined in the bore of the first ring blank. Accordingly, the target holder is secured to the inner ring.

In another embodiment, the groove may be hard machined in the outer cylindrical surface of the first ring blank. In this case, the target holder is secured to the outer ring.

The invention also relates to a sensor bearing unit mounted according to the above-mentioned method.

The invention further relates to a sensor bearing unit comprising:

a bearing comprising an inner ring and an outer ring centered on an axis, and an impulse ring provided with a target holder secured into a groove made in a cylindrical surface of the inner or outer ring, and with a magnetic target mounted the target holder.

According to a general feature, the groove of the inner or outer ring is hard machined.

In one embodiment, the groove is made by hard machining in the bore of the inner ring. Alternatively, the groove may be made by hard machining in the outer cylindrical surface of the outer ring.

BRIEF DESCRIPTION OF THE FIGURES

The present invention and its advantages will be better understood by studying the detailed description of a specific embodiment given by way of a non-limiting example and illustrated by the appended drawings on which.

DETAILED DESCRIPTION OF THE EMBODIMENTS

Figure 1:
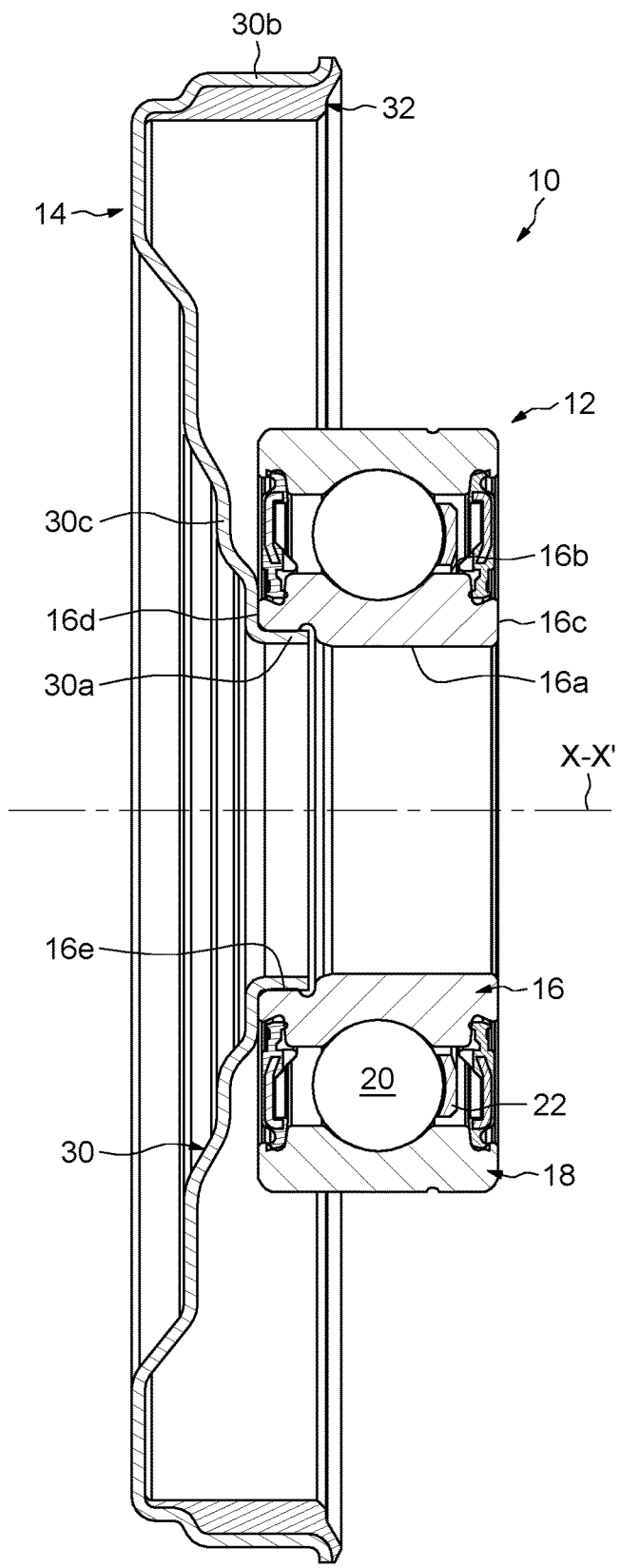
FIG. 1 is an axial section view of a sensor bearing unit according to an example of the invention.

The sensor bearing unit 10 represented on FIG. 1 is adapted to equip an apparatus such a motor, a brake system, a suspension system or any rotating machine, in particular for an automotive vehicle.

The sensor bearing unit 10 comprises a bearing 12 and an impulse ring 14 mounted on the bearing.

The bearing 12 comprises comprising a first ring 16 and a second ring 18. In the illustrated example, the first ring 16 is the inner ring whereas the second ring 18 is the outer ring.

The inner and outer rings 16, 18 are concentric and extend axially along the bearing rotation axis X-X' which runs in an axial direction. The inner and outer rings 16, 18 are made of steel.

In the illustrated example, the bearing 12 also comprises a row of rolling elements 20, which are provided here in the form of balls, interposed between raceways (not referenced) formed on the inner and outer rings 16, 18. The rolling bearing 10 also comprises a cage 22 for maintaining the regular circumferential spacing of the rolling elements 20.

The inner ring 16 of the bearing is intended to be mounted on a shaft of the apparatus for tracking the rotation of the shaft. The inner ring 16 is intended to rotate while the outer ring 18 is intended to be fixed. The outer ring 18 can be mounted in a fixed support member or housing, belonging to the apparatus.

The inner ring 16 comprises a cylindrical inner surface or bore 16a and an outer cylindrical surface 16b which is radially opposite to the bore 16a and from which a toroidal circular raceway for the rolling elements 20 is formed, the raceway being directed radially outwards. The inner ring 16 further comprises two opposite radial lateral faces 16c, 16d which axially delimit the bore 16a and the outer surface 16b of the ring.

The inner ring 16 also comprises a cylindrical groove 16e made in the bore 16a. The groove 16e is centered on the axis X-X'. Diameter of bore 16a is smaller than diameter of groove 16e. The groove 16e opens on the radial lateral face 16d.

The impulse ring 14 is mounted on the inner ring 16. The impulse ring 14 comprises an annular target holder 30 mounted on the inner ring 16, and a magnetic target 32 mounted on the target holder.

The target holder 30 is secured into the annular groove 16e of the inner ring. The target holder 30 comprises an inner annular axial portion 30a mounted into the groove 16e, an outer annular axial portion 30b radially surrounding the inner axial portion 30a and the bearing 12, and an annular radial portion 30c extending between the inner and outer axial portions.

The inner axial portion 30a of the target holder is fitted into the groove 16e of the inner ring to fasten in rotation the impulse ring 14 with the rotatable inner ring 16. In the disclosed example, the radial portion 30c of the target holder axially comes into contact against the radial lateral face 16d of the inner ring. The outer axial portion 30b of the target holder is located radially above the outer ring 18 of the bearing.

In the disclosed example, the target holder 30 is made in one part. The target holder 30 may be made of metal or plastic, formed by stamping or by any other suitable process.

The magnetic target 32 is mounted on the outer axial portion 30b of the target holder. In the disclosed example, the magnetic target 32 is mounted into the bore of the outer axial portion 30b. Alternatively, the magnetic target 32 may be mounted on the outer surface of the outer axial portion 30b.

The magnetic target 32 is a plastic molded part including magnetic alternating North and South alternated poles. Detection means (not shown) are associated with the target 32 for tracking the rotation of the impulse ring 14 and the inner ring 16 around the axis X-X'. The detection means are disposed to radially face the inner surface of the magnetic target 32. For example, the detection means may include Hall-effect sensors.

Figure 2:
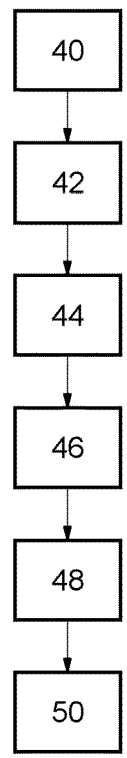
FIG. 2 shows the main steps of a method for manufacturing the sensor bearing unit of FIG. 1 according to a second example of the invention.

FIG. 2 shows the main steps of a method for manufacturing the sensor bearing unit according to an example of the invention.

According to this example, the manufacturing method provides a preliminary turning step 40 that provides an inner ring blank having a shape roughly corresponding to the shape of the finished inner ring with a machining allowance. During this preliminary turning step 40, the bore 16*a* (FIG. 1), the groove 16*e*, the outer cylindrical surface 16*b*, the raceway formed onto the outer surface and the lateral faces 16*c*, 16*d* are soft turned.

Following the preliminary soft turning step 40, a heat-treatment step 42 is applied in which the metal of the inner ring blank is hardened. The heat-treatment may be applied to obtain a hardness included in the range of 58 to 62 Vickers. For example, a through-hardening operation is applied to the whole inner ring blank.

After the heat-treatment step 42, the inner ring blank is machined by hard turning during a step 44. The following rough surfaces of the inner ring blank are hard turned: the bore 16*a*, the groove 16*e*, the outer cylindrical surface 16*b*, the raceway and the lateral faces 16*c*, 16*d*. The machining allowance initially left on the inner ring blank is removed during the hard turning step 44.

Then, a grinding step 46 is achieved on the bore 16*a*, the raceway and the lateral faces 16*c*, 16*d* of the machined inner ring.

At this stage of the sensor bearing unit manufacturing method, an assembly step 48 of the components of the bearing may be performed before the mounting of the target holder of the impulse ring. Alternatively, the assembly of the components of the bearing may be performed after the mounting of the target holder on the machined inner ring.

During the mounting step 50 of the target holder, the inner axial portion 30*a* of the target holder is introduced into the groove 16*e* of the machined inner ring. Optionally, the target holder 30 may be turned in the circumferential direction inside the groove 16*e* of the inner ring to a specific angular position. Then, the target holder 30 is secured inside the groove 16*e* of the inner ring. To this end, the inner axial portion 30*a* of the target holder may be press-fitted inside the groove 16*e*. Alternatively, the inner axial portion 30*a* of the target holder may be secured inside the groove 16*e* of the inner ring by any other appropriate means, for example by gluing or welding.

As previously mentioned, with the manufacturing method of the invention, the value of the concentricity defect of the inner groove 16*e* with respect to the inner ring bore diameter is smaller than the one obtained for a conventional sensor bearing unit.

Figure 3:
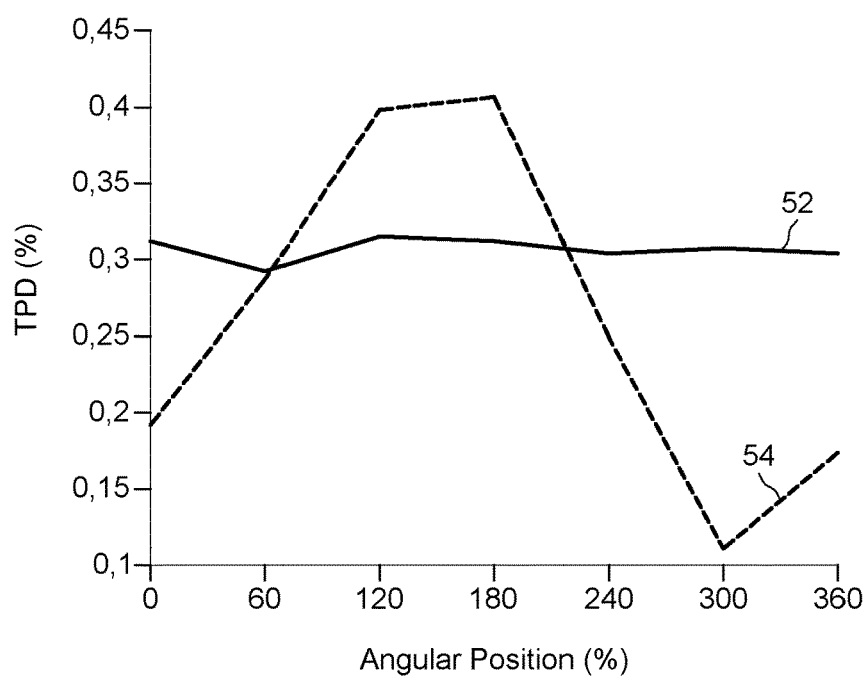
FIGS. 3 and 4 are curves showing the evolution of the total pitch deviation of a magnetic impulse ring for the sensor bearing unit of FIG. 1 and for a conventional sensor bearing unit.

On FIG. 3, the curve 52 shows the evolution of the total pitch deviation of the magnetic target 32 (FIG. 1) of the impulse ring for the sensor bearing unit manufactured according to the invention, the impulse ring being fixed at various angular positions in the groove 16*e* of the inner ring.

The curve 54 shows the evolution of the total pitch deviation of the target of an impulse ring of a conventional sensor bearing unit having an inner groove made only by soft turning, the impulse ring being also fixed at various angular positions in the groove of the inner ring.

As shown on FIG. 3, for the sensor bearing unit manufactured according to the invention, the total pitch deviation variations are limited.

Figure 4:
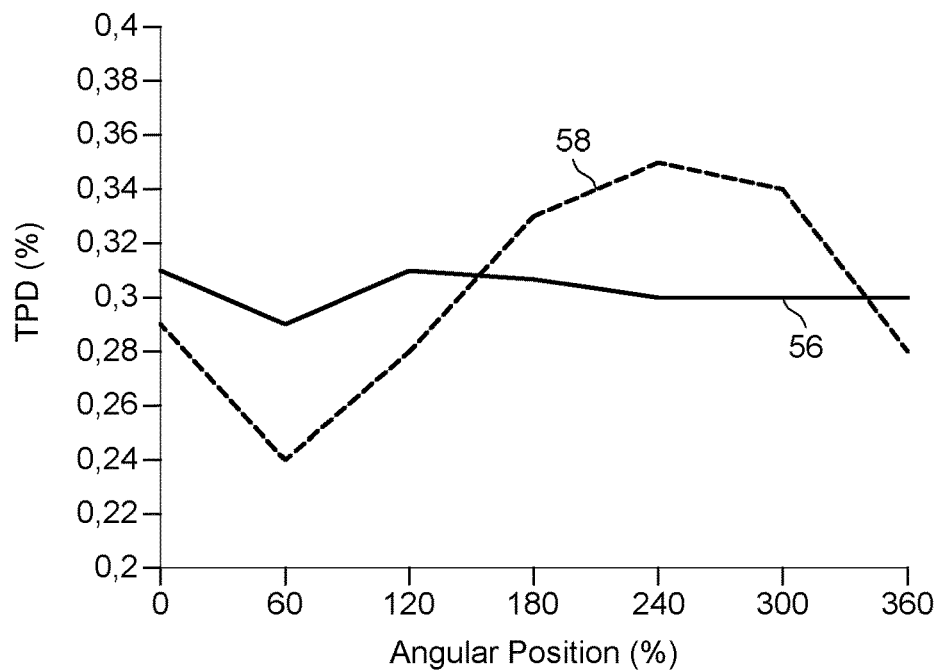

On FIG. 4, the curves 56, 58 also respectively show the evolution of the total pitch deviation of the magnetic target of the impulse ring for the sensor bearing unit manufactured according to the invention, and for a conventional sensor bearing unit. Here, the sensor bearing units have be chosen such that both inner grooves of the inner rings have the same concentricity defect.

As shown on FIG. 4, a hard-turned inner groove enables to almost cancel the total pitch deviation variations dues to its geometrical defects.

Figure 5:
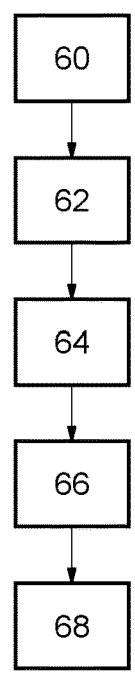
FIG. 5 shows the main steps of a method for manufacturing the sensor bearing unit of FIG. 1 according to a first example of the invention.

FIG. 5 shows the main steps of a method for manufacturing the sensor bearing unit according to another example of the invention.

Similarly to the first example, the manufacturing method provides a preliminary turning step 60 that provides an inner ring blank having a shape roughly corresponding to the shape of the finished inner ring with a machining allowance. During this preliminary turning step 60, the bore 16*a* (FIG. 1), the groove 16*e*, the outer cylindrical surface 16*b*, the raceway formed onto the outer surface and the lateral faces 16*c*, 16*d* are soft turned.

Similarly to the first example, following the preliminary soft turning step 60, a heat-treatment step 62 is applied in which the metal of the inner ring blank is hardened. For example, a through-hardening operation is applied to the whole inner ring blank.

After the heat-treatment step 62, the inner ring blank is machined by hard grinding during a step 64. The following rough surfaces of the inner ring blank are hard grinded: the bore 16*a*, the groove 16*e*, the raceway and the lateral faces 16*c*, 16*d*. The machining allowance initially left on the inner ring blank is removed during the hard grinding step 64.

At this stage of the sensor bearing unit manufacturing method, an assembly step 66 of the components of the bearing may be performed before the mounting of the target holder of the impulse ring. Alternatively, the assembly of the components of the bearing may be performed after the mounting of the target holder on the machined inner ring.

Finally, the mounting step 68 of the target holder is performed as previously described in the first example.

In the illustrated examples, the sensor bearing unit is provided with a rolling bearing comprising one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

Otherwise, as previously mentioned, in this illustrated examples, the first ring of the rolling bearing is the inner ring 16 whereas the second ring is the outer ring 18. As an alternative, it could be possible to provide a reversed arrangement with the first ring forming the outer ring and the second ring forming the inner ring. In this case, the target holder is secured to the outer ring.

The invention claimed is:

1. A method for manufacturing a sensor bearing unit comprising:
   providing a bearing comprising a first ring and a second ring capable of rotating concentrically relative to one another, and
   providing an impulse ring having a target holder secured into a groove made in a cylindrical surface of the first ring, and with a magnetic target mounted on an outer annular axial portion of the target holder, the magnetic target being located radially between the outer annular axial portion and the bearing, the method comprising the following steps:
   a) applying on a first ring blank a heat-treatment in which the metal is hardened, b) hard machining the groove in the cylindrical surface of the first ring blank after the step of heat treating, and c) introducing and securing the target holder of the impulse ring inside the groove of the machined first ring.

2. The method according to claim 1, further comprising, before step a), the step of preliminary machining the groove in the cylindrical surface of the first ring blank by soft turning with a machining allowance.

3. The method according to claim 1, wherein at step a) at least a through-hardening operation is applied.

4. The method according to claim 1, wherein at step b) a hard turning operation is applied.

5. The method according to claim 4, further comprising, after step b) and before step c), the step of grinding the cylindrical surface and lateral faces of the machined first ring.

6. The method according to claim 1, wherein at step b) a hard grinding operation is applied.

7. The method according to claim 1, wherein at step b) the groove is hard machined in the bore of the first ring blank forming the cylindrical surface.

8. A sensor bearing unit manufactured according to the method of claim 1.

9. The method according to claim 1, wherein at step b) a hard turning operation is applied.

10. The method according to claim 9, further comprising, after step b) and before step c), the step of grinding the cylindrical surface and lateral faces of the machined first ring.

11. A method for manufacturing a sensor bearing unit comprising:

providing a bearing comprising a first ring and a second ring capable of rotating concentrically relative to one another, and providing an impulse ring having a target holder secured into a groove made in a cylindrical surface of the first ring, and with a magnetic target mounted on a radially outermost annular axial portion of the target holder, the impulse ring having a first portion configured to contact an axially extending portion of the first ring, the impulse ring having a second portion extending from the first portion and configured to radially overlap and contact an axial end of the first ring, the impulse ring having a third portion extending axially and radially outwardly from an end of the second portion opposite from the first portion of the impulse ring to radially overlap the second ring while being spaced therefrom, the radially outermost annular axial portion extending from an end of the third portion opposite from the second portion to axially overlap a portion of the bearing, the method comprising the following steps:

a) applying on a first ring blank a heat-treatment in which the metal is hardened, b) hard machining the groove in the cylindrical surface of the first ring blank after the step of heat treating, and c) introducing and securing the target holder of the impulse ring inside the groove of the machined first ring.

12. The method according to claim 11, further comprising, before step a), the step of preliminary machining the groove in the cylindrical surface of the first ring blank by soft turning with a machining allowance.

13. The method according to claim 11, wherein at step a) at least a through-hardening operation is applied.

14. The method according to claim 11, wherein at step b) a hard grinding operation is applied.

15. The method according to claim 11, wherein at step b) the groove is hard machined in the bore of the first ring blank forming the cylindrical surface.

* * * * *